UNITED STATES PATENT OFFICE.

EMIL SCHMOLL, OF BASLE, SWITZERLAND, ASSIGNOR TO BASLE CHEMICAL WORKS, OF SAME PLACE.

FERRUGINOUS NUCLEINS AND PROCESS OF MAKING SAME.

SPECIFICATION forming part of Letters Patent No. 668,460, dated February 19, 1901.

Application filed September 10, 1900. Serial No. 29,510. (No specimens.)

*To all whom it may concern:*

Be it known that I, EMIL SCHMOLL, chemist, doctor of medicine, a citizen of the Swiss Republic, and a resident of Basle, Switzerland, have invented new and useful Improvements in the Manufacture of Ferruginous Nucleins, of which the following is a clear and complete specification.

I have found that by cultivating yeast in ferruginous nutrient material the yeast takes up or absorbs part of the iron. From the yeast thus treated ferruginous nucleo-albumins may be isolated by artificial digestion. The nucleo-albumins thus obtained contain the iron only partly in stable organic combination—i. e., in a form from which the iron can be precipitated only after some time by a small quantity of ammonium sulfid. By treating these nucleo-albumins with a hot diluted solution of sodium carbonate a preparation is obtained from which all the iron can be precipitated only by a prolonged action of ammonium sulfid—i. e., in this compound the iron is contained in a masked form analogous to that of the ferruginous nucleins contained in food.

Example I: Ten liters of fresh yeast containing dry matter amounting to about twenty per cent. of this volume are mixed with about one hundred to five hundred grams of ferric chlorid and five hundred to five thousand grams of grape-sugar, and the mixture is digested with agitation for about five days. The liquid is then filtered off and the solid residue stirred with ten liters of artificial gastric juice, at 37° centigrade, until the albumins of the cells are digested and only the grains of yeast are visible under the microscope. This lasts from ten to twelve hours. The solid residue of the digestion is filtered off, boiled with a diluted solution of sodium carbonate, and then washed with hydrochloric acid of 0.3-per-cent. strength until no iron can be detected in the washings. The product is then dried and powdered.

Example II: A nutritious broth is mixed with 0.5 per cent. of citrate of iron and a sufficient quantity of sodium carbonate to dissolve the precipitate produced by the citrate of iron. The whole is then sterilized. The solution is next inoculated with a pure culture of a species of yeast—for example, *Saccharomyces apiculatus*—until a sufficient quantity of the culture has been developed. The latter is then filtered, digested with artificial gastric juice, and treated further as in Example I.

The ferruginous nuclein obtained according to the foregoing examples is a yellow-brown powder insoluble in water, alcohol, and ether. In sodium carbonate and soda-lye it is partly soluble when left standing for some time. This ferruginous nuclein shows a formation of iron sulfur only after being left to stand for some time with a small quantity of ammonium sulfid. Larger quantities of this reagent precipitate iron sulfur after a shorter time. Alcoholic hydrochloric acid (ten volumes per cent. hydrochloric acid and ninety volumes per cent. alcohol of ninety-six-per-cent. strength) or 0.3 to 3 per cent. dilute hydrochloric acid does not separate iron, by which fact the ferruginous nuclein can pass the stomach without being decomposed. When boiled with hydrochloric acid, it assumes a light-yellow color. If this solution then be made alkaline with NaOH, the ferruginous nuclein is again precipitated in large flakes. The ferruginous nuclein produced contains from one to one and four-tenths per cent. of iron and from three to four per cent. of phosphorus.

The ferruginous nuclein is used for persons as medicine as a remedy for chlorosis and anemia in doses of 0.5 to one gram, to be taken three times a day.

What I claim is—

1. The herein-described process for the manufacture of ferruginous nucleins, which consists in first cultivating yeast in ferruginous nutrient material, then digesting the yeast thus obtained, then boiling the solid residue from the digestion with a dilute solution of sodium carbonate, and finally washing the said residue with dilute hydrochloric acid.

2. As a new article of manufacture, the herein-described ferruginous nuclein derived from yeast, the same containing phosphorus and from one to one and four-tenths per cent.

of iron in stable organic combination, and being a yellow-brown powder, insoluble in water, alcohol and ether, partly soluble in a sodium-carbonate solution and soda-lye when left standing for some time, and not decomposable in the stomach.

In witness whereof I have hereunto signed my name, this 27th day of August, 1900, in the presence of two subscribing witnesses.

EMIL SCHMOLL.

Witnesses:
 GEO. GIFFORD,
 AMAND RITTER.